(12) United States Patent
Tancerel et al.

(10) Patent No.: US 11,005,711 B2
(45) Date of Patent: May 11, 2021

(54) RECONFIGURABLE NETWORK OF SENSORS

(71) Applicant: MAPLE HIGH TECH, Toulouse (FR)

(72) Inventors: Ludovic Tancerel, Toulouse (FR); Réjane Dalce, Castres (FR)

(*) Notice: Subject to any disclaimer, the term of this patent is extended or adjusted under 35 U.S.C. 154(b) by 0 days.

(21) Appl. No.: 16/072,625

(22) PCT Filed: Jan. 20, 2017

(86) PCT No.: PCT/EP2017/051139
§ 371 (c)(1),
(2) Date: Jul. 25, 2018

(87) PCT Pub. No.: WO2017/129478
PCT Pub. Date: Aug. 3, 2017

(65) Prior Publication Data
US 2019/0068441 A1    Feb. 28, 2019

(30) Foreign Application Priority Data
Jan. 29, 2016    (FR) ..................................... 16 50725

(51) Int. Cl.
*H04L 12/24*      (2006.01)
*H04W 84/20*      (2009.01)
(Continued)

(52) U.S. Cl.
CPC ........ *H04L 41/0813* (2013.01); *H04L 5/0055* (2013.01); *H04L 41/12* (2013.01);
(Continued)

(58) Field of Classification Search
CPC combination set(s) only.
See application file for complete search history.

(56) References Cited

U.S. PATENT DOCUMENTS

| 2002/0075940 A1* | 6/2002 | Haartsen | ................ H04B 1/713 |
| | | | 375/132 |
| 2009/0290572 A1* | 11/2009 | Gonia | ................... H04J 3/0641 |
| | | | 370/350 |

(Continued)

OTHER PUBLICATIONS

Abbasi et al., "A Distributed Connectivity Restoration Algorithm in Wireless Sensor and Actor Networks", 32nd IEEE Conference on Local Computer Networks. IEEE Computer Society, Oct. 1, 2007, pp. 496-503.

(Continued)

*Primary Examiner* — Xavier S Wong
(74) *Attorney, Agent, or Firm* — Pearne & Gordon LLP (57) ABSTRACT

A method for reconfiguring a network of wireless sensors in which certain nodes, referred to as coordinating anchors, emit beacon signals, and others, referred to as subordinated anchors, receive the signals only for synchronisation purposes. The whole network synchronises from peer to peer via wireless links from a primary anchor, the various nodes being further configured, via an auxiliary channel, from a central server. When a node loses its synchronisation, one or more subordinated anchors can be transformed into coordinating anchors by the central server so as to restore the synchronisation of the node. Likewise, when an electronic tag moves through the network, subordinated anchors can be transformed dynamically into coordinating anchors in order to ensure the synchronisation of the tag.

15 Claims, 7 Drawing Sheets

(51) Int. Cl.
*H04L 5/00* (2006.01)
*H04W 56/00* (2009.01)
*H04L 12/703* (2013.01)
*H04W 84/18* (2009.01)

(52) U.S. Cl.
CPC ......... *H04W 56/001* (2013.01); *H04W 84/20* (2013.01); *H04L 45/28* (2013.01); *H04W 84/18* (2013.01)

(56) References Cited

U.S. PATENT DOCUMENTS

| | | | |
|---|---|---|---|
| 2010/0080118 A1 | 4/2010 | Yamauchi | |
| 2015/0006633 A1* | 1/2015 | Vandwalle | H04L 67/1051 709/204 |
| 2015/0188695 A1* | 7/2015 | Crowell | H04B 11/00 398/155 |
| 2015/0223154 A1* | 8/2015 | Jeong | H04W 48/16 370/338 |
| 2018/0027421 A1* | 1/2018 | Chrabieh | H04W 16/20 455/446 |

OTHER PUBLICATIONS

Garcia-Sanchez et al. "Optimized orphan algorithm for IEEE 802.15.4 networks", Technical University of Cartagena, ISWCS, Sep. 7, 2009, pp. 428-432.
Zen et al. "Performance evaluation of IEEE 802.15.4 for mobile sensor networks", School of Engineering, Edith Cowan University. IEEE, May 5, 2008, pp. 1-6.
Tchuani-Tchakonte et al. "Adaptive healing procedure for lifetime improvement in Wireless Sensor Networks", IEEE 21st International On-Line Testing Symposium (IOLTS), IEEE , 2015, pp. 59-64.
Wang et al. "Sensor relocation in mobile sensor networks", Dept of Computer Science & Engineering, The Pennsylvania State University, Proc. of Annual Joint Conference of the IEEE Computer and Communications Societies (INFOCOM), 2015, pp. 1-11.
International Search Report for International Application No. PCT/EP2017/051139, dated Feb. 20, 2017.
Preliminary French Search Report for Application No. FR 1650725, dated Jul. 26, 2016.

* cited by examiner

RECONFIGURABLE NETWORK OF SENSORS

CROSS-REFERENCE TO RELATED APPLICATIONS

This is a National Stage application of PCT international application PCT/EP2017/051139, filed on Jan. 20, 2017, which claims the priority of French Patent Application No. 16 50725, filed Jan. 29, 2016, both of which are incorporated herein by reference in their entirety.

TECHNICAL FIELD

The object of the present invention relates to the field of reconfigurable sensor networks. The present invention is in particular applicable to tag communication management in such a network.

STATE OF PRIOR ART

Wireless sensor networks (WSN) have been recently extensively investigated.

It is reminded that a WSN network is an ad hoc network including a great number of nodes which are generally sensors capable of collecting and transmitting measurements autonomously. The position of the nodes in such a network is not necessarily determined. When a node of the network knows its position or can determine it, it is called an "anchor node" or simply anchor.

One of the most frequently encountered problems in a wireless sensor network is the hardware or software failure of a node. The occurrence of the failure of a node generates a network coverage hole.

Different solutions have been provided in the state of the art to overcome the appearance of a coverage hole. A first strategy called a static maintenance strategy consists in replacing a first sub-set of nodes ensuring coverage by a second sub-set of network nodes, previously in sleep mode, ensuring the same coverage and thus redundant with the first one. A second strategy called a dynamic maintenance strategy consists in dynamically reconfiguring the network, for example by adaptively completing the nodes of the first sub-set the battery level of which is still sufficient with nodes of the second sub-set, to enable a number of targets to be covered. The latter technique has been described in the paper by D. Tchuani-Tchakonte and al. entitled "Adaptive healing procedure for lifetime improvement in Wireless Sensor Networks" published in Proc. of On-Line Testing Symposium (OLTS), pp. 59-64, 2015.

The network reconfiguration strategy described in this paper is however only applicable when the network nodes are fixed. The advent of mobile WSN networks (that is the nodes of which are mobile) and of hybrid networks (that is some nodes of which are fixed and other nodes are mobile) has raised new strategies to overcome the coverage hole problem. These strategies have generally in common to identify and locate the failing node, to select replacement nodes and to move the replacement nodes so as to fill the coverage hole. An example of such a reconfiguration strategy has been described in the paper by G. Wang and al. entitled "Sensor relocation in mobile sensor networks" published in Proc. of Annual Joint Conference of the IEEE Computer and Communications Societies (INFOCOM), 2015.

The reconfiguration strategies of mobile (or even hybrid) WSN networks suppose that the different nodes have the ability to know or calculate their position (namely are anchors in the sense defined above) and that some of them additionally have the ability to be autonomously moved and oriented. To that end, the anchors can be equipped with a GPS receiver or a triangulation system with respect to fixed anchors. Such a solution is complex and expensive, or even just impracticable in some types of environment. Further, when the new position of an anchor is erroneous, the measurements performed by or thanks to this anchor will also be erroneous. The errors can thus propagate cumulatively up to reach a significant part of the WSN network.

The problem underlying the invention is consequently to provide a method for reconfiguring a WSN network which has not the abovementioned drawbacks, in particular which neither necessitates redundancy in the network nor requires to physically move the network anchors to fill a coverage hole.

DISCLOSURE OF THE INVENTION

The present invention is defined by a method for reconfiguring a wireless sensor network organised in a tree architecture, said network comprising nodes of a first type, called coordinating anchors, capable of receiving and emitting a beacon signal and nodes of a second type, called subordinate anchors, capable of receiving a beacon signal for synchronising with the network, the nodes being additionally connected by an auxiliary channel to a central server, in which, when a node loses its synchronisation with the network, it informs the central server about it and the latter infers, from the network topology, the coordinating anchor originating the synchronisation loss and the network sub-tree affected by the synchronisation loss, the central server selects a couple of nodes consisting of a first node belonging to said sub-tree and a second node belonging to the rest of the network (S\ST), and if the second node is a subordinate anchor, transmits a transformation command to it in order to transform it into a coordinating anchor, the first node synchronising with the network by means of the beacon signal emitted by the second node thus transformed.

When the second node receives the transformation command from the central server, it sends an acknowledgment message to it and transmits its own beacon signal.

When the first node receives the beacon signal from the second node, the latter sends a message to the central server indicating that it is synchronised.

If the first node is a subordinate anchor and the sub-tree is not only this first node, the central server transmits a transformation command to it in order to transform it into a coordinating anchor, at least a third node belonging to said sub-tree then synchronising by means of the beacon signal emitted by the first node thus transformed.

When the first node receives a transformation command from the central server, the latter begins to emit its own beacon signal and sends an acknowledgment message to it.

Advantageously, the central server selects the couple of nodes based on a criterion of minimum distance separating these nodes and/or a criterion of link quality between these nodes.

The invention also relates to a method for reconfiguring a wireless sensor network organised in a tree architecture, said network comprising nodes of a first type, called coordinating anchors, capable of receiving and emitting a beacon signal and nodes of a second type, called subordinate anchors, capable of receiving a beacon signal for synchronising with the network, the nodes being additionally connected by an auxiliary channel to a central server, at least one electronic tag being mobile within the network, said tag being capable of synchronising with the network from a beacon signal emitted by a coordinating anchor, wherein, when said tag has not received a beacon signal for a first predetermined time interval, the latter broadcasts orphan notifications as long as it does not receive again a beacon signal, and as long as the subordinate anchors of the network receiving the orphan notifications each transmit to the central server a report comprising an identifier for the tag, the MAC address of the subordinate anchor having received the orphan notification and an indicator of the link quality between said tag and the subordinate anchor, the central server selecting a subordinate anchor from those having received the orphan notifications based on at least said link quality, the central server transmitting a transformation command to the subordinate anchor thus selected to transform it into a coordinating anchor, said tag synchronising with the network by means of the beacon signal emitted by the coordinating anchor thus obtained.

The report sent by a subordinate anchor further comprises the number of orphan notifications received from the tag for a second predetermined time interval.

The central server advantageously performs selecting the subordinate anchor based on a criterion of connection quality between the subordinate anchor and the tag, and, optionally, a number of orphan notifications received from the tag by the subordinate anchor for the second predetermined time interval.

When the selected subordinate anchor receives a transformation command from the central server, the latter starts to emit its own beacon signal and sends an acknowledgment message to the central server by the auxiliary channel.

When said tag receives the beacon signal from the coordinating anchor thus obtained, it transmits to the latter an association request by means of a unicast message.

According to one exemplary embodiment, the sensor network is compliant with the IEEE 802.15.4 standard.

The auxiliary channel can be a wire connection or a Wi-Fi connection.

BRIEF DESCRIPTION OF THE DRAWINGS

Further characteristics and advantages of the invention will appear upon reading a preferential embodiment of the invention, making reference to the appended figures in which.

DETAILED DISCLOSURE OF PARTICULAR EMBODIMENTS

It will be considered in the following a WSN network, and more particularly a network obeying the IEEE 802.15.4 communication protocol, such as a ZigBee™ or 6LoW-PAN™ network. It will be supposed that the media access control layer (MAC layer) operates in beacon mode, in other words that the network includes a number of coordinating nodes transmitting at regular intervals, a beacon that is a signal enabling the surrounding nodes to be synchronised. The network physical layer is preferably a UWB (Ultra Wide Band) communication system.

Figure 1:
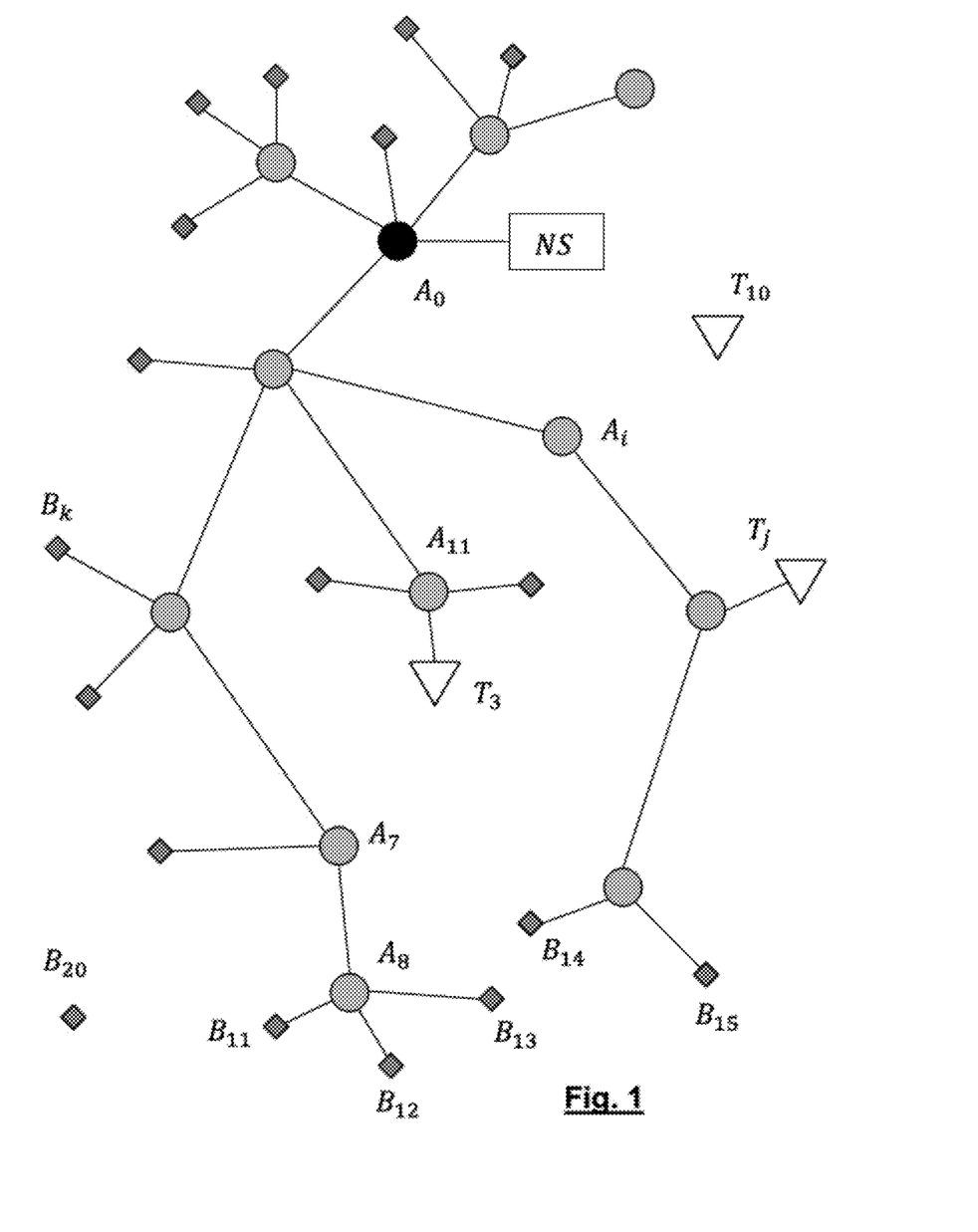
FIG. 1 schematically represents a WSN network that can be reconfigured by the reconfiguration method according to the invention.

FIG. 1 represents an example of WSN network able to be reconfigured by the reconfiguration method according to the present invention.

The network is organised in a tree topology (also called cluster-tree) around a master coordinating node noted $A_0$, also called primary coordinating anchor in the following. The set of the network nodes is noted S.

It will be supposed that the network in question comprises two types of anchors. The anchors of the first type or coordinating anchors, noted $A_i$, $i=0, \ldots, N-1$ hereinafter, can emit beacons whereas the anchors of the second type or subordinate anchors, noted $B_k$, $k=1, \ldots, M$ hereinafter, are for receiving beacons from surrounding coordinating anchors without being possible them to emit them. In a normal operation, a subordinate anchor is connected to a coordinating anchor by a radio link, for example a UWB connection.

Further, the coordinating anchors and subordinate anchors are connected to a central server NS by another channel, called an auxiliary channel, the cut probability of which is lower than that of the radio link. According to a first alternative embodiment, the auxiliary channel is a wire connection, for example an Ethernet connection. According to a second alternative embodiment, when the radio link is a UWB connection, the auxiliary channel is a Wi-Fi connection. In case of radio link loss with its coordinating anchor, a subordinate anchor can be found isolated from the rest of the WSN network (case of the anchor $B_{20}$) but it however remains connected to the server NS by its auxiliary channel.

Without loss of generality, it will be supposed that the auxiliary channel uses a wire connection in the following. For the sake of legibility, the wire connections between the anchors and the central server have not been represented in the figure.

The server NS can be co-located with the primary coordinating anchor. The radio links are in particular used to synchronise the nodes to each other whereas the wire connections with the server enable the nodes to be configured.

Tags, for example RFID transponders, noted $T_j$, $j=1, \ldots, P$, are also present in the zone where the network extends and they are connected to the infrastructure by radio links. These tags receive the beacons emitted by the coordinating anchors to synchronise with the network. On the other hand, when a tag does not receive any beacon (case of the tag $T_{10}$ for example), it emits orphan notifications which are then received by the subordinate anchors and coordinating anchors within its reach.

Figure 2:
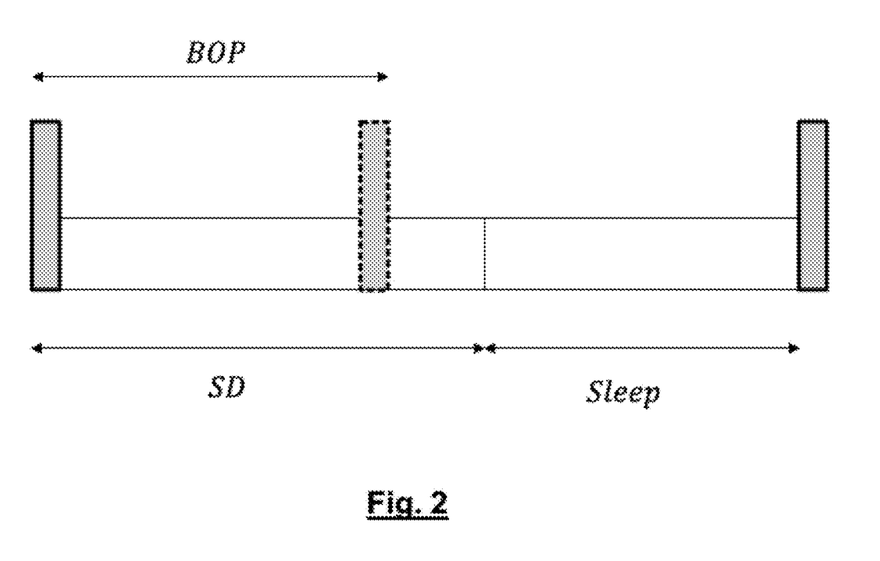
FIG. 2 schematically represents an example of time organisation of beacon emissions in the network.

FIG. 2 schematically represents an exemplary time organisation of beacon emissions in the network.

The beacons emitted by a coordinating anchor are emitted with a BI (Beacon Interval) period. The transmission between anchors obeys a timing imposed by the primary coordinating anchor, consisting in repeating an interval with the BI period. Each interval between two successive beacons comprises a superframe with a SD (superframe duration) duration followed by a sleep period. A sufficiently long time interval is provided at the beginning of the superframe, which is dedicated to the transmission of the beacons by the different coordinating anchors. This interval is known in the state of the art under the BOP (Beacon Only Period) acronym. Thus, the beacons emitted by the coordinating anchors of the network are all emitted for the BOP interval.

The different nodes synchronise when the network is switched on: the primary coordinating anchor, $A_0$, emits a beacon signal which acts as a time reference for the rest of the network. The surrounding coordinating anchors receive the beacon signal via their respective radio links with $A_0$ and transmit their beacon signals in turn.

The process is repeated and spreads until all the coordinating anchors periodically emit their beacons. In the same way, the subordinate anchors and tags present in the zone covered by the network receive beacon signals from coordinating anchors within their reach.

When a network node (coordinating or subordinate anchor) receives beacon signals from several coordinating anchors, the former selects the coordinating anchor based on a criterion of link quality, for example the coordinating anchor the beacon signal of which is of the highest power or the link with the highest signal to noise ratio. This coordinating anchor is also called a reference anchor for the node in question.

Each node just synchronised informs the central server about it and indicates to it the reference anchor it depends on. Thus, the central server has a table providing, for each node, its type (coordinating or subordinate anchor), its synchronisation status (node synchronised or not) and in the case where it is synchronised, its reference anchor.

If, for any reason, a node does not detect the beacon signal of its reference anchor any longer, the same informs the central server about it: its status switches from synchronised to non-synchronised. The loss of the beacon signal can be due to a breakdown affecting its reference anchor or a connection loss with the latter. In any case, the node that lost the synchronisation switches to a listening mode and periodically performs scanning to search for a new beacon signal. As a result, there is a significant energy consumption.

In a similar way, when a tag does not receive a beacon signal any longer, this broadcasts orphan notifications. The anchors (being coordinating or subordinate) which receive these notifications relay the synchronisation loss information to the central server by means of their wire connections.

Figure 3A:
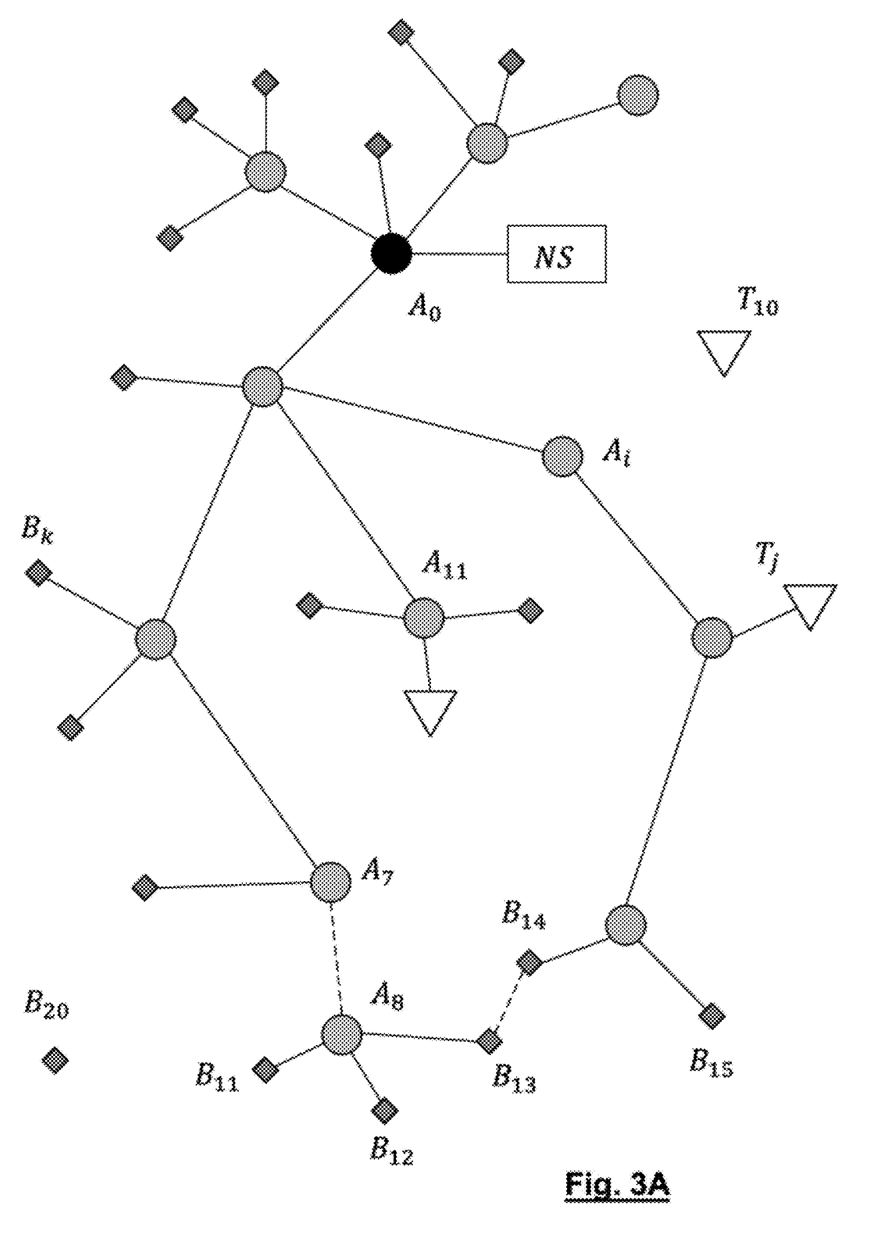
FIGS. 3A and 3B illustrate first and second examples of synchronisation loss in the network of FIG. 1.

FIG. 3A illustrates a first example of synchronisation loss in the network of FIG. 1.

In the case illustrated, the anchor $A_8$ was synchronised by virtue of the beacon signal transmitted by the anchor $A_7$, in other words the anchor $A_7$ was the reference anchor for the anchor $A_8$. The breakdown affecting the anchor $A_7$ induces a synchronisation loss of the anchor $A_8$ (connection in dashed line) which informs the central server about it. The anchor $A_8$ cannot emit a beacon anymore, and as a result the subordinate anchors $B_{11}$, $B_{12}$ and $B_{13}$ loss themselves their synchronisation to the rest of the network and notify it to the central server.

The central server knows the tree structure of the different anchors from the primary coordinating anchor (the root of the tree) up to the subordinate anchors (the leaves of the tree). It can determine from the lost connection(s) the reference anchor (herein $A_7$) originating the synchronisation loss and thus the sub-tree ST of the network affected by the synchronisation loss.

The central server knows the geographical position of the anchors (being coordinating and subordinate) as well as the network topology. It searches in the set of nodes S\ST, that is from the nodes of the set S not being part of the sub-set ST, an anchor capable of being used as a new reference anchor for one of the nodes of the sub-tree ST.

Different reconfiguration scenarios are possible:

according to a first scenario, the anchor $A^*=A_8$, at the root of the sub-tree ST, is close to at least one other coordinating anchor of S\ST having a synchronised status. By close to, it is meant herein a distance lower than a predetermined threshold value or a connection quality (expressed for example in signal to noise ratio) higher than a predetermined threshold level. When such a coordinating anchor of S\ST exists, the anchor $A^*$ thus receives a beacon signal therefrom. If several coordinating anchors of S\ST are close to $A^*$, the closest to $A^*$ (for example that corresponding to the best connection quality) is selected. This first scenario does not require a reconfiguration of the anchors insofar as a coordinating anchor substitutes for another coordinating anchor as a reference anchor.

according to a second scenario, the anchor $A^*$ is close to at least one subordinate anchor of S\ST having a synchronised status. In the case where several such subordinate anchors are close to $A^*$, the closest to $A^*$ is selected. The central server transmits (by wire route) to the subordinate anchor thus selected a transformation command which orders it to become a coordinating anchor. This new coordinating anchor is noted $A^s$. The anchor $A^s$ begins to transmit its own beacon signal. Further, it confirms its type change by transmitting (by wire route) an acknowledgment message to the central server. Once the anchor $A^*$ is synchronised with the anchor $A^s$, it transmits (by wire route) on its own to the central server its status change. The central server updates its table by modifying the type of the anchor $A^s$ and by modifying the status of the anchor $A^*$ (from non-synchronised to synchronised).

according to a third scenario, a subordinate anchor of the sub-tree ST is close to a coordinating anchor of S\ST. In the case where several couples of subordinate anchor and coordinating anchor satisfy this condition, the subordinate anchor of ST and the coordinating anchor of S\ST which are closest to each other (lower distance or best connection quality) are retained. The central server asks the subordinate anchor of ST thus selected to become a coordinating anchor. This sends back an acknowledgment message to the central server and emits its own beacon signal when it is synchronised.

according to a fourth scenario (illustrated in FIG. 3A), a subordinate anchor of the sub-tree ST, is close to at least one subordinate anchor of S\ST (having a synchronised status). In the case where several couples of subordinate anchors belonging to the Cartesian product ST×(S\ST) satisfy the previous condition, the couple of subordinate anchors closest to each other in the previously defined sense could be chosen. Alternatively, the couple of subordinate anchors $(B_i, B_j)$ of ST×(S\ST) could be retained, such that $B_j$ is located at the top in the tree structure of S (that is the number of connections of which separating it from the root $A_0$ is the lowest). In any case, the central server asks the anchors $B_i, B_j$ (herein $B_{13}, B_{14}$) for switching to another type to become coordinating anchors. They each send back an acknowledgment message when the switching is operated and the anchor $B_i = B_{13}$ informs the server that it is synchronised (setting the connection represented as a chain-dotted line).

It will be noted that the reconfiguration according to the third or fourth scenario may not make it possible to synchronise straightaway all the nodes of the sub-tree ST. This should thereby be iterated until all the nodes of the sub-tree are synchronised. In addition, several sub-trees can be affected by a breakdown of a node. In this case, the different sub-trees are processed sequentially.

At the end of the reconfiguration process, the network connectivity is restored and all the nodes are synchronised.

Figure 3B:
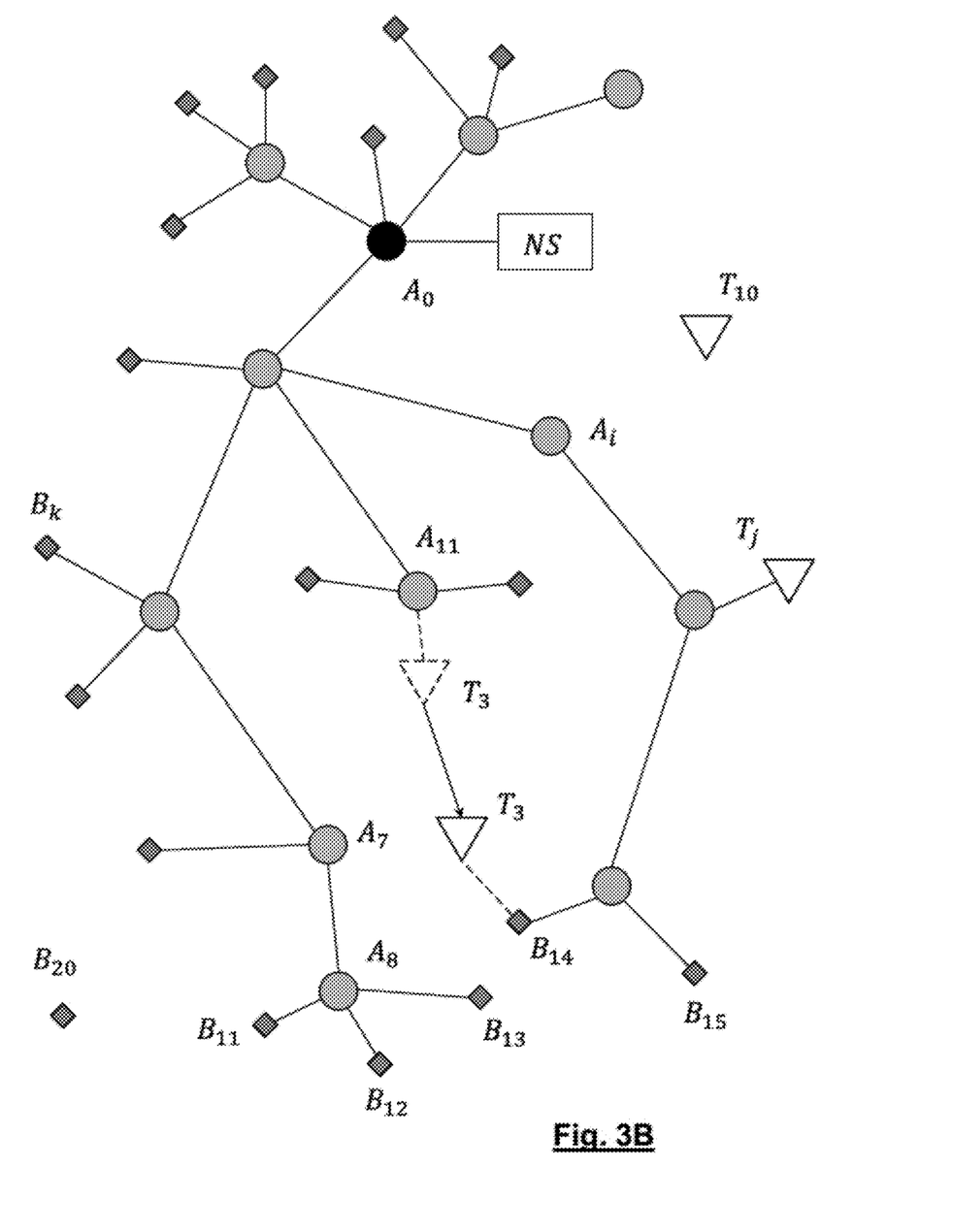

FIG. 3B illustrates a second example of synchronisation loss in the network of FIG. 1.

In the case illustrated, the tag $T_3$ has moved and lost its synchronisation by exiting the coverage zone of its reference anchor $A_{11}$.

Since the tag $T_3$ does not receive a beacon signal any longer, it emits orphan notifications. Generally, a tag not receiving a predetermined number of successive beacons deduces that it lost its association with its reference anchor and transmits orphan notifications. These notifications are received by the anchors (being subordinate or coordinating) located in the proximity of the tag trajectory, as it moves.

If the tag enters the coverage zone of a new coordinating anchor and consequently receives again a beacon signal, this tag immediately terminates to transmit orphan notifications, synchronises by virtue of the beacon signal and emits an association request (unicast message). The coordinating anchor answers the association demand by a confirmation message and informs the central server about this new association.

On the other hand, if the orphan notification is received by a subordinate anchor, the latter sends a report by wire route to the central server. This report comprises the address (MAC address for example) of the subordinate anchor that received the notification, the identifier of the tag which transmitted this notification, as well as an indicator of the link quality between the tag and the anchor in question. Optionally, the report can comprise the number of orphan notifications received by the anchor as well as the time stamps of the notifications received.

The central server can determine, at any time, from the reports of the anchors having received the orphan notifications, the best qualified subordinate anchor to act as a reference anchor for the tag. For example, the central server could select the anchor the connection with the tag of which has the highest quality and/or the highest number of orphan notifications.

The central server NS sends to the subordinate anchor thus selected (herein $B_{14}$) a transformation command ordering it to change type, that is to become a coordinating anchor. The tag then receives the beacon signal of the new coordinating anchor. Upon receiving the beacon signal, the tag terminates to transmit orphan notifications and emits instead an association request. The new coordinating anchor informs (by wire route) the central server about this new association (the new connection is indicated by a chain-dotted line).

Regardless of whether it is the synchronisation of an anchor or of a tag, a subordinate anchor may have to be reconfigured into a coordinating anchor. The BOP interval is chosen sufficiently long to be able to add a coordinating anchor without collision risk with the already existing beacons.

Figure 4:
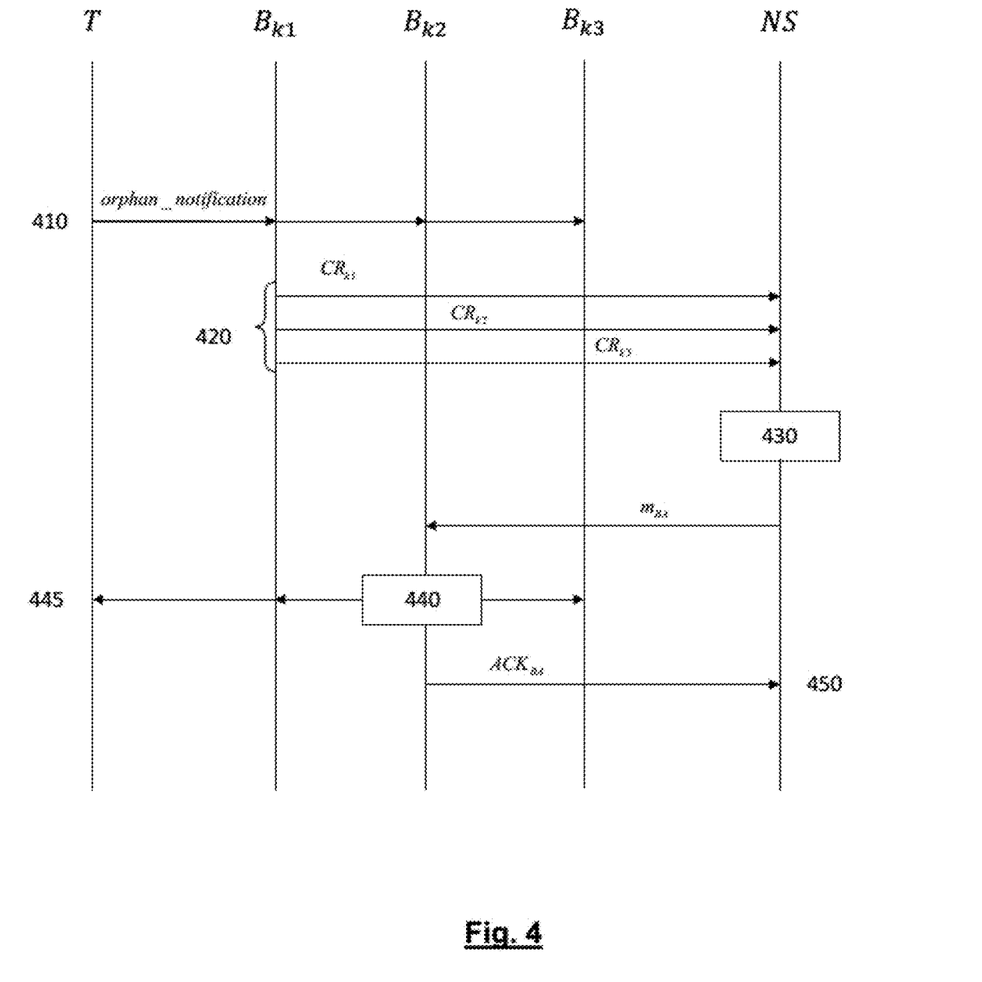
FIG. 4 represents an example of message exchange in the network in case of synchronisation loss of a tag.

FIG. 4 represents an example of message exchange in the network in case of synchronisation loss of a tag.

The messages transmitted by wire route are indicated by double dash arrows and those transmitted by a radio channel are indicated by single dash arrows.

In 410, if the tag T has not received a predetermined number of consecutive beacons, this tag begins to broadcast orphan notifications.

These notifications are received by anchors of the network, herein subordinate anchors noted $B_{k1}, B_{k2}, B_{k3}$. Each of these anchors transmits in 420 a report to the central server, that is $CR_{k1}$, $CR_{k2}$, $CR_{k3}$, each report comprising the MAC address of the subordinate anchor, the identifier of the tag T, an indicator of connection quality between the tag and the subordinate anchor in question and possibly the number of notifications received from the tag T as well as the time stamps of these notifications.

The central server determines in 430 which subordinate anchor has to be converted into a coordinating anchor based on indicators of connection quality and, possibly, the numbers of notifications received. In the case illustrated, the central server selects the anchor $B_{k2}$ and transmits a transformation command $m_{BA}$ to it ordering it to change type and to become a coordinating anchor.

Upon receiving the message $m_{BA}$, the anchor $B_{k2}$ begins to emit its beacon signal in 440 with the BI periodicity, the beacon being emitted in the time BOP interval. The tag receives the beacon signal from the anchor $B_{k2}$ in 445 and synchronises with the network by virtue of this signal.

Further, the anchor $B_{k2}$ confirms to the central server that it has actually become a coordinating anchor in 450.

Figure 5:
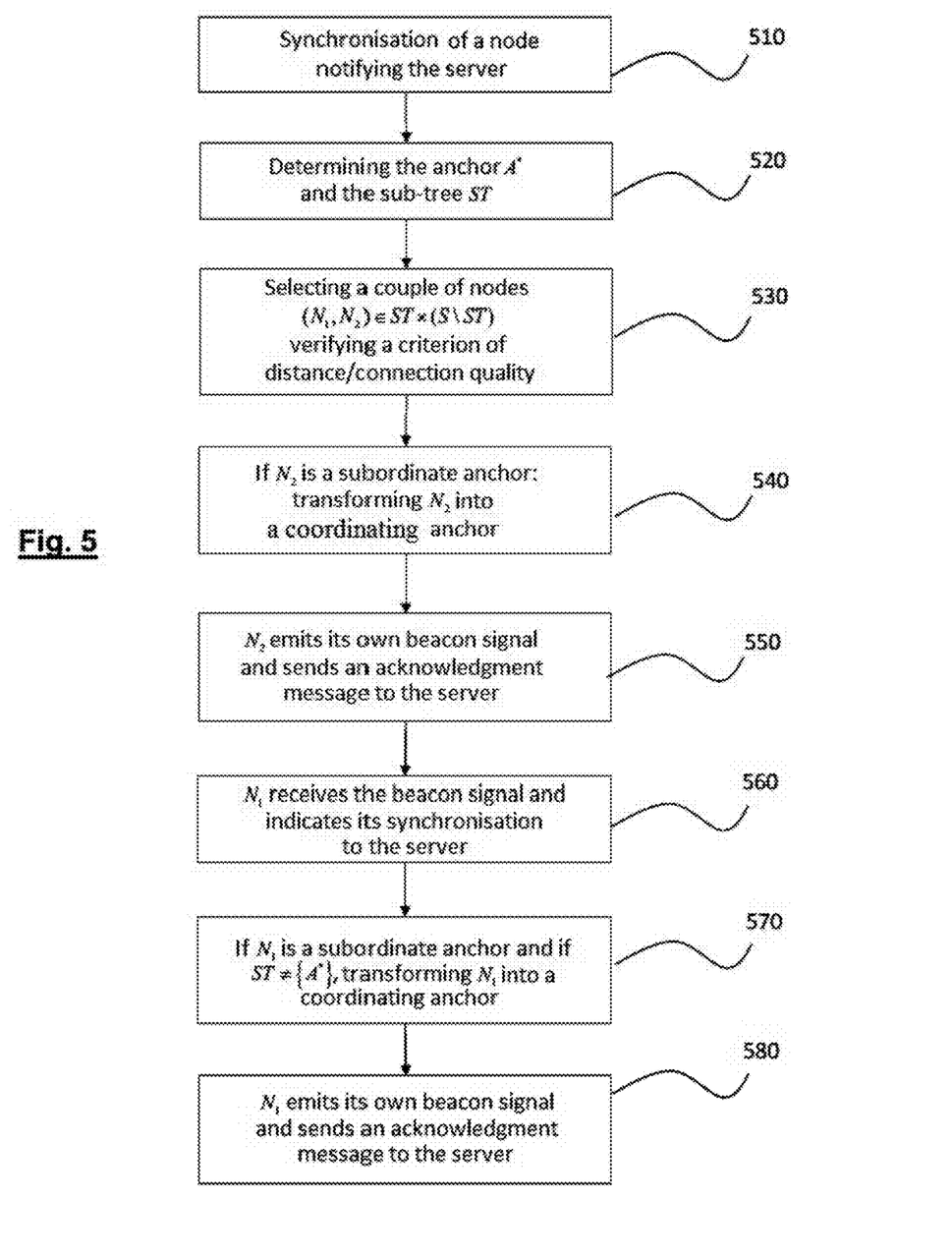
FIG. 5 schematically represents a flowchart of the method for reconfiguring a WSN network according to a first embodiment of the invention.

FIG. 5 schematically represents a flowchart of a method for reconfiguring a WSN network according to a first embodiment of the invention.

The network S comprises at least one coordinating anchor, given that this coordinating anchor is the primary coordinating anchor when the network has only one of them.

The network nodes which are not coordinating anchors in the above defined sense are subordinate anchors.

All the network anchors are connected to the central server by a wire connection.

In case of synchronisation loss, any node not receiving a beacon signal of its reference anchor for a first predetermined time interval any longer informs the central server about it in 510. The first time interval can be set equal to a multiple of the BI period.

In 520, the central server determines, from the logic topology of the network, the reference anchor originating the synchronisation loss and the sub-tree ST of the network S affected by the synchronisation loss in question. The root of this sub-tree is a node noted A*.

In 530, the central server selects a couple of nodes consisting of a first node belonging to the sub-tree ST and a second node belonging to the rest of the network, S\ST. This selection can be based on a criterion of distance and/or a criterion of connection quality. In other words, the central server can choose the couple of closest nodes and/or the nodes having the best connection quality (for example thanks to a signal to noise ratio indicator). If none of the couples of nodes is distant by less than a predetermined distance or has a higher quality connection than a predetermined level, the central server terminates the network reconfiguration process.

In 540, if the second node is a subordinate anchor, the central server transmits a transformation command to it indicating it to become a coordinating anchor. The latter then emits immediately its own beacon signal and sends back an acknowledgment message to the central server in 550. When the second node is a coordinating anchor, no reconfiguration of this anchor is necessary.

In 560, when the first node receives the beacon signal from the second node, the first node sends to the central server a message indicating it that it is actually synchronised.

In 570, if the first node is a subordinate anchor and that the sub-tree ST is not only the singleton {A*}, the central server transmits to the first node a transformation command into a coordinating anchor such that it is capable of synchronising at least one part of the nodes of the sub-tree ST.

When the first node receives a transformation command from the central server, the first node begins to emit its own beacon signal and sends an acknowledgment message to the central server in 580.

The process described in steps 530 to 580 can be possibly iterated until all the nodes of the sub-tree are synchronised.

Figure 6:
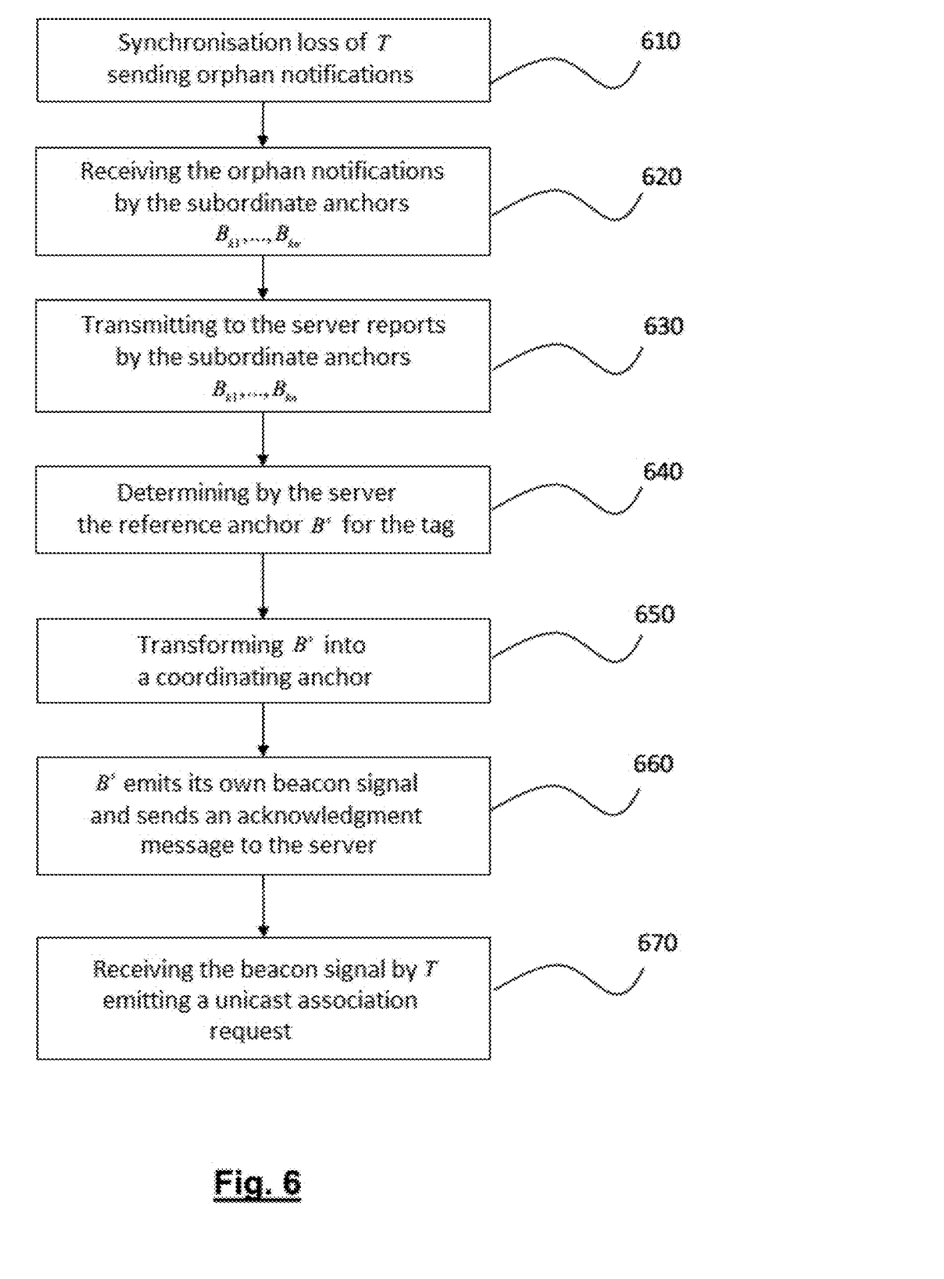
FIG. 6 schematically represents a flowchart of the method for reconfiguring a WSN network according to a second embodiment of the invention.

FIG. 6 schematically represents a flowchart of the method for reconfiguring a WSN network according to a second embodiment of the invention.

This embodiment relates to a reconfiguration of the network S when a tag T has lost its synchronisation with the network, that is has not received a beacon signal for a first predetermined time interval. This first time interval can be set equal to a multiple of the BI period.

In step 610, the tag T broadcasts orphan notifications.

If the tag T receives again a beacon signal, it synchronises again with the network, terminates to broadcast orphan notifications and instead emits an association demand with the coordinating anchor that emitted the beacon signal. This scenario does not require a reconfiguration of the network anchors (simple hand-over process).

In step 620, an orphan notification is received by one or more subordinate anchors of the network, $B_{k1}, \ldots, B_{kn}$.

In step 630, each of the anchors $B_{k1}, \ldots, B_{kn}$ transmits a report to the central server comprising the tag identifier, the MAC address of the subordinate anchor that received the notification and the indicator of the connection quality between the tag and the subordinate anchor in question. As previously indicated, the report can further comprise the number of notifications received (for example within a second predetermined time interval, multiple of BI) and the time stamps of these notifications.

In step 640, the central server determines from the reports of $B_{k1}, \ldots, B_{kn}$, the subordinate anchor $B^s$ which will act as a reference for the tag T. The choice can be made depending on the connection quality and, possibly, the number of notifications received for the second time interval.

In step 650, the central server transmits to the selected anchor $B^s$ a transformation command ordering it to become a coordinating anchor.

In step 660, the anchor $B^s$ emits its own beacon signal and transmits an acknowledgment message to the central server.

In step 670, the tag T receives the beacon signal of $B^s$, transmits to $B^s$ an association request, as a unicast message having as an argument the MAC address of $B^s$, and terminates to broadcast orphan notifications.

The other subordinate anchors that do not receive orphan notifications any longer consequently terminate to transmit reports to the central server.

Thus, the tag can move within the network, subordinate anchors within its reach dynamically switching to the state of coordinating anchors along its trajectory to ensure synchronisation of the tag.

What is claimed is:

1. A method for reconfiguring a wireless sensor network organised in a tree architecture, said network comprising nodes of a first type, called coordinating anchors, configured to receive and emit a first beacon signal and nodes of a second type, called subordinate anchors, configured to receive a second beacon signal for synchronising with the network, the nodes being additionally connected by an auxiliary channel to a central server, wherein, when a node loses its synchronisation with the network, it informs the central server (510) about it and the central server infers (520), from the network topology, the coordinating anchor originating the synchronisation loss and the network sub-tree (ST) affected by the synchronisation loss, the central server selects (530) a couple of nodes consisting of a first node belonging to said sub-tree and a second node belonging to the rest of the network (S\ST), and if the second node is a subordinate anchor, transmits a transformation command to the subordinate anchor in order to transform the subordinate anchor into a coordinating anchor, the first node synchronising with the network by means of a third beacon signal emitted by the second node thus transformed.

2. The method for reconfiguring a wireless sensor network according to claim 1, wherein, when the second node receives the transformation command from the central server, the second node sends an acknowledgment message to the central server and transmits its own third beacon signal.

3. The method for reconfiguring a wireless sensor network according to claim 1, wherein, when the first node receives the second beacon signal from the second node, the second node sends a message to the central server indicating that the second node is synchronised.

4. The method for reconfiguring a wireless sensor network according to claim 1, wherein, if the first node is a subordinate anchor and the sub-tree does not only include the first node, the central server transmits a transformation command to the first nodes in order to transform the first node into a coordinating anchor, and at least a third node belonging to said sub-tree is synchronized by means of the first beacon signal emitted by the first node thus transformed.

5. The method for reconfiguring a wireless sensor network according to claim 4, wherein, when the first node receives a transformation command from the central server, the first node begins to emit its own fourth beacon signal and sends an acknowledgment message to the central server.

6. The method for reconfiguring a wireless sensor network according to claim 1, wherein the central server selects the couple of nodes based on a criterion of minimum distance separating these nodes and/or a criterion of link quality between these nodes.

7. The method for reconfiguring a wireless sensor network according to claim 1, wherein the sensor network is compliant with the IEEE 802.15.4 standard.

8. The method for reconfiguring a wireless sensor network according to claim 1, wherein the auxiliary channel is a wire connection.

9. The method for reconfiguring a wireless sensor network according to claim 1, wherein the auxiliary channel is a Wi-Fi connection.

10. A method for reconfiguring a wireless sensor network organised in a tree architecture, said network comprising nodes of a first type, called coordinating anchors, configured to receive and emit a first beacon signal and nodes of a second type, called subordinate anchors, configured to receive a second beacon signal for synchronising with the network, the nodes being additionally connected by an auxiliary channel to a central server, at least one electronic tag being mobile within the network, said tag being configured to synchronise with the network from a third beacon signal emitted by a coordinating anchor, wherein when said tag has not received the third beacon signal for a first predetermined time interval, the tag broadcasts (610) orphan notifications as long as the tag does not receive again the third beacon signal, and as long as the subordinate anchors of the network receiving the orphan notifications (620) each transmit (630) to the central server a report comprising an identifier for the tag, the MAC address of the subordinate anchor having received the orphan notification and an indicator of the link quality between said tag and the subordinate anchor, the central server selecting (640) a subordinate anchor from those having received the orphan notifications based on at least said link quality, the central server transmitting (650) a transformation command to the subordinate anchor thus selected to transform the subordinate anchor into a coordinating anchor, said tag synchronising with the network by means of the third beacon signal emitted by the coordinating anchor thus obtained.

11. The method for reconfiguring a wireless sensor network according to claim 10, wherein the report sent by the subordinate anchor further comprises the number of orphan notifications received from the tag for a second predetermined time interval.

12. The method for reconfiguring a wireless sensor network according to claim 11, wherein the central server performs selecting the subordinate anchor based on a criterion of connection quality between the subordinate anchor and the tag.

13. The method for reconfiguring a wireless sensor network according to claim 11, wherein the central server performs selecting the subordinate anchor based on a criterion of connection quality between the subordinate anchor, the tag, and a number of orphan notifications received from the tag by the subordinate anchor for the second predetermined time interval.

14. The method for reconfiguring a wireless sensor network according to claim 10, wherein when the selected subordinate anchor receives a transformation command from the central server, the selected subordinate anchor starts to emit its own fourth beacon signal and sends (660) an acknowledgment message to the central server by the auxiliary channel.

15. The method for reconfiguring a wireless sensor network according to claim 14, wherein when said tag receives the fourth beacon signal from the coordinating anchor, the tag transmits to the coordinating anchor an association request by means of a unicast message.

* * * * *